(12) United States Patent
Ostanek

(10) Patent No.: US 10,164,304 B1
(45) Date of Patent: Dec. 25, 2018

(54) THERMALLY DISSIPATIVE ELECTROCHEMICAL CELL

(71) Applicant: Jason K. Ostanek, Springfield, PA (US)

(72) Inventor: Jason K. Ostanek, Springfield, PA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 708 days.

(21) Appl. No.: 14/529,933

(22) Filed: Oct. 31, 2014

(51) Int. Cl.
*H01M 10/6554* (2014.01)
*H01M 10/058* (2010.01)

(52) U.S. Cl.
CPC .............................. *H01M 10/6554* (2015.04)

(58) Field of Classification Search
CPC ... H01M 10/60–10/617; H01M 10/64–10/647; H01M 10/65–10/655; H01M 10/6554–10/6555
See application file for complete search history.

(56) References Cited

U.S. PATENT DOCUMENTS

| | | | |
|---|---|---|---|
| 3,373,060 A | 3/1968 | Gray | |
| 3,734,778 A | 5/1973 | Huf et al. | |
| 3,895,959 A * | 7/1975 | Dehmelt | H01M 10/34 429/152 |
| 4,322,484 A | 3/1982 | Sugalski | |
| 4,539,272 A * | 9/1985 | Goebel | H01M 2/22 429/101 |
| 5,164,273 A * | 11/1992 | Szasz | H01M 10/0413 429/123 |
| 5,501,916 A | 3/1996 | Teramoto et al. | |
| 5,849,431 A | 12/1998 | Kita et al. | |
| 5,972,532 A | 10/1999 | Oweis et al. | |

(Continued)

FOREIGN PATENT DOCUMENTS

WO   2013152149 A1   10/2013

OTHER PUBLICATIONS

U.S. Appl. No. 14/242,974, invention entitled "Device for Simulating Thermal Characteristics of a Lithium-Ion Battery," inventor Jason K. Ostanek, filed Apr. 2, 2014, now U.S. Pat. No. 9,622,294 B1, issued Apr. 11, 2017 (patent cited hereinabove).

(Continued)

*Primary Examiner* — Jonathan Crepeau
*Assistant Examiner* — Jacob Buchanan
(74) *Attorney, Agent, or Firm* — Howard Kaiser

(57) ABSTRACT

According to exemplary practice of the present invention, a cylindrical secondary electrochemical cell (e.g., lithium-ion cell) includes a disk that is made of a thermally and electrically conductive material (e.g., metal material), and that lies in a geometric plane that is perpendicular to the cylindrical axis. The disk is adjacently intermediate, axially aligned with, and electrically connected to two cylindrical jelly-roll electrode components. Inventive practice is possible with respect to a variety of cell types, shapes, and chemistries. Depending on the inventive embodiment, the numbers of disks (≥1) and jelly-roll electrode components (≥2) can vary, each disk serving to augment heat transport in the radial direction. An inventive cylindrical cell thus affords superior heat spreading in the direction radially outward, 360 degrees, from the central axis of the cell.

14 Claims, 7 Drawing Sheets

(56) References Cited

U.S. PATENT DOCUMENTS

| | | |
|---|---|---|
| 6,016,047 A | 1/2000 | Notten et al. |
| 6,020,084 A | 2/2000 | Romero et al. |
| 6,117,584 A | 9/2000 | Hoffman et al. |
| 6,165,638 A | 12/2000 | Spillman et al. |
| 6,630,270 B1 | 10/2003 | Kim et al. |
| 6,838,923 B2 | 1/2005 | Pearson |
| 7,442,465 B2 | 10/2008 | Kim et al. |
| 8,263,246 B2 | 9/2012 | Fuhr et al. |
| 8,263,247 B2 | 9/2012 | Kim |
| 9,048,028 B2 | 6/2015 | West et al. |
| 9,622,294 B1 | 4/2017 | Ostanek |
| 2005/0095505 A1 | 5/2005 | Ohata et al. |
| 2006/0035140 A1* | 2/2006 | Matsumoto ........... H01M 2/266 429/160 |
| 2006/0073380 A1* | 4/2006 | Kim .................... H01M 10/052 429/129 |
| 2007/0254212 A1* | 11/2007 | Viavattine .............. A61N 1/375 429/164 |
| 2009/0154064 A1 | 6/2009 | Tasaki et al. |
| 2010/0227209 A1* | 9/2010 | Kim ....................... H01G 9/038 429/94 |
| 2011/0043962 A1 | 2/2011 | Azais et al. |
| 2012/0301768 A1 | 11/2012 | Ramamurthi et al. |
| 2014/0113184 A1 | 4/2014 | Hamel et al. |

OTHER PUBLICATIONS

Ahmad A. Pesaran, Robert Rehn, Ronald Russell, John Crawford, Ed Lewis, "A Unique Calorimeter-Cycler for Evaluating High-Power Battery Modules," slideshow presentation, 13th Annual Battery Conference on Applications and Advances, California State University, Long Beach, California, Jan. 13-16, 1998.

Ahmad A. Pesaran, Donald J. Russell, John W. Crawford, Robert Rehn, and Edwin A. Lewis, "A Unique Calorimeter-Cycler for Evaluating High-Power Battery Modules," 13th Annual Battery Conference on Applications and Advances, California State University, Long Beach, California, Jan. 13-16, 1998, Proceedings, Piscataway, New Jersey, Institute of Electrical and Electronics Engineers, Inc., 1998, pp. 127-131.

\* cited by examiner

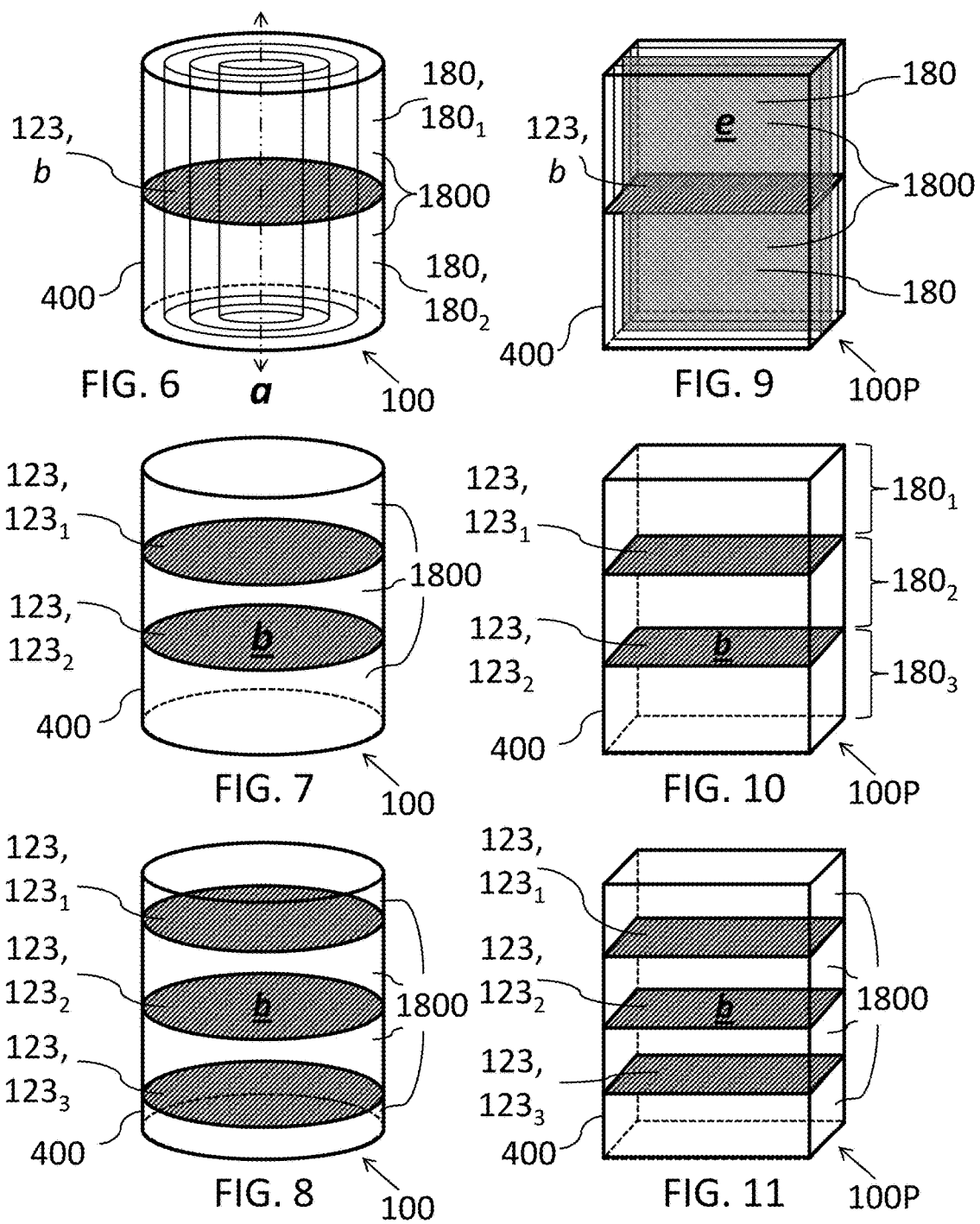

THERMALLY DISSIPATIVE ELECTROCHEMICAL CELL

BACKGROUND OF THE INVENTION

The present invention relates to electrochemical cells, more particularly to thermal characteristics, such as heat dissipation, of electrochemical cells.

Secondary lithium-ion (Li-ion) battery cells possess a superior ability to source energy at high rates for extended periods of time, as compared with other electrochemical devices. An important challenge associated with Li-ion cells is thermal management. Cell performance and cell lifetime are both closely associated with cell temperature. Generally speaking, cell operation at cold temperatures results in reduced performance, and cell operation at high temperatures results in reduced lifetime. In addition, cell operation at high temperatures poses a risk of cell failure that is potentially very dangerous to personnel near the device. In order to ensure safe and reliable operation, a cell should be maintained at reasonable temperatures (e.g., at room temperature), and the temperature gradient within the cell itself should be kept to a minimum.

Li-ion cells are typically manufactured in either a prismatic or cylindrical shape. Cylindrical cells are commonly available on the commercial market ranging from small format cells (e.g., for laptops and power tools) to large format cells (e.g., for military use and electric vehicles). A major drawback of conventional cylindrical cell architecture is the difficulty for heat removal from the very center of the cell, due to the spiral windings internal to the cell. Conventional prismatic cells also tend to be deficient in shedding heat across (e.g., normal to) the adjacent layers, even those cells that are rather flat, e.g., similar to the shape of a notepad.

Conventional electrochemical cells constructed with layered electrode swirls (found in cylindrical cells) or stacks (in prismatic cells) tend to be characterized by good or sufficient thermal conductivity in the "in-plane" direction (i.e., in the geometric planes described by the electrode layers), but by poor or insufficient thermal conductivity in the "cross-cutting" or "out-of-plane" direction (i.e., across or perpendicular to the geometric planes described by the electrode layers). Cylindrical cells typically use layered electrode swirls (circular "jelly-rolls"). Prismatic cells typically use layered electrode stacks, but some prismatic cells use electrode swirls (flattened "jelly-rolls") that are similar to those used by cylindrical cells. The prior art has focused upon improvement of heat transfer characteristics along the axial-longitudinal direction of the cell.

Of particular note are cylindrically wound cells that have been disclosed in the literature as having a central axial component that is solid or hollow and that extends partially or completely along the length of the cell. Such approaches to improving heat conduction characteristics of a cell seek to remove heat at the axial core of the cell using an axially-extended heat conductor. For instance, heat can be conducted by a device extending longitudinally-axially through a hollow core region of a cylindrical cell, or by a coolant medium that is passed through a pipe extending longitudinally-axially through a hollow core region of a cylindrical cell. While configurations of this nature may improve the ability of a cell (such as a cylindrical cell) to shed heat from the centermost regions, thermal conduction in the "out-of-plane" direction is usually the limiting factor.

The term "jelly-roll" is conventionally understood in battery cell arts to refer to the spiral-wound design characterizing most cylindrical secondary (rechargeable) batteries, such as lithium-ion (Li-ion) batteries, nickel-cadmium (NiCd) batteries, and nickel-metal hydride (NiMH) batteries. Some prismatic secondary batteries, as well, are characterized by a spiral-wound design of this kind. According to typical design of a cylindrical jelly-roll battery, a single electrode sandwich is rolled up and inserted into a hollow cylindrical casing, the cell is sealed, and metal contacts are attached. The sandwich has an anode material layer, a separator layer, and a cathode material layer; according to some conventional embodiments, the sandwich also has an insulating layer. In cross-section, the cylindrical battery resembles a jelly-roll cake. In a prismatic jelly-roll battery, the rolled-up electrode sandwich is flattened prior to insertion into a hollow prismatic casing. A jelly-roll design is usually used for secondary batteries, as distinguished from primary (non-rechargeable) batteries.

Pertinent references include the following patent documents, each of which is hereby incorporated herein by reference: Fuhr et al. U.S. Pat. No. 8,263,246 B2 ("Current Collector for an Electrochemical Cell"); Kim et al. U.S. Pat. No. 7,442,465 B2 ("Jelly-Roll Type Electrode Assembly, Lithium Secondary Battery Having the Same, and Method for Manufacturing the Same"); Hoffman et al. U.S. Pat. No. 6,117,584 ("Thermal Conductor for High-Energy Electrochemical Cells"); Romero et al. U.S. Pat. No. 6,020,084 ("Electrochemical Cell Design with a Hollow Core"); Oweis et al. U.S. Pat. No. 5,972,532; Teramoto et al. U.S. Pat. No. 5,501,916 ("Battery Having a Through-Hole and Heat Dissipating Means"); Sugalski U.S. Pat. No. 4,322,484 ("Spiral Wound Electrochemical Cell Having High Capacity"); Ramamurthi et al. U.S. Patent Application Publication No. 2012/0301768 A1 ("Battery Cell Design and Method of Cooling Battery Cells"); Yoon et al. International Patent Application (PCT) No. WO 2013/152149 A1 ("The Lithium Ion Prismatic Cell Comprising Multiple Jelly-rolls with Additional Material between Jelly-rolls").

SUMMARY OF THE INVENTION

In view of the foregoing, an object of the present invention is to provide an electrochemical cell characterized by improved heat dissipation.

In accordance with exemplary practice of the present invention, the present invention's electrochemical cell includes at least one thermally conductive plate, at least two electrode components, and a casing. The casing is characterized by a cell length, and contains the at least one thermally conductive plate and the at least two electrode components. Each thermally conductive plate is: perpendicular to the cell length; interposed between two electrode components; electrically conductive; and, electrically connected to the two electrode components between which the thermally conductive plate is interposed.

In an exemplary inventive prismatic cell, each electrode component is characterized by a stacking of parallel planar electrodes that each extend along a portion of the cell length. Each thermally conductive plate is a thermally conductive rectangular plate that is approximately coextensive with the prismatic casing. In an exemplary inventive cylindrical cell, the casing is characterized by an axis along the cell length. Each electrode component is characterized by a jelly-roll electrode configuration. Each thermally conductive plate is a thermally conductive disk that is approximately coextensive with the cylindrical casing. The electrode components and the thermally conductive plate share the axis.

An exemplary inventive method for making an electrochemical cell includes combining at least one thermally conductive plate, at least two electrode components, and a case. The case is characterized by a cell length. The combining includes situating the at least one thermally conductive plate and the at least two electrode components inside the case whereby each thermally conductive plate is perpendicular to the cell length and is interposed between two electrode components. The inventive method further comprises selecting the thickness of the at least one thermally conductive plate.

The selecting of the thickness of the at least one thermally conductive plate includes weighing, as associated with an increase in said thickness of the at least one thermally conductive plate, a decrease in the capacity of the cell versus an increase in the thermal dissipativity of the cell. The electrochemical cell is characterized by a capacity, a radial thermal resistance, and a thermal dissipativity. The case is characterized by a volume. The at least one thermally conductive plate is characterized by a thickness. The capacity of the cell increases in accordance with increasing volume of the case. The volume of the case decreases in accordance with increasing thickness of the at least one thermally conductive plate. The radial thermal resistance of the cell decreases in accordance with increasing thickness of the at least one thermally conductive plate. The thermal dissipativity of the cell increases in accordance with decreasing radial thermal resistance of the cell.

Generally speaking, a conventional cylindrical cell's ability to shed heat is limited in the radial direction (i.e., the direction across the circular spiraled electrode layers); a conventional prismatic cell's ability to shed heat is limited in the transverse direction (i.e., the direction across the stacked electrode layers, or across the flattened spiraled electrode layers). Exemplary practice of the present invention improves heat transfer in the radial direction of a cylindrical cell, and in the transverse direction of a prismatic cell. The present invention's novel electrochemical cell facilitates heat transfer in the "out-of-plane" direction with respect to a layered electrode configuration. The present invention represents a novel construction of electrochemical cells that affords a unique ability to shed heat buildup from the innermost parts of the cells.

The terms "in-plane direction" and "out-of-plane direction" are used herein to describe two basic directions in relation to the layered configuration of an electrochemical cell. Essentially, the "in-plane direction" is oriented within the geometric planes defined by the layers, whereas the "out-of-plane" direction is oriented crosswise (e.g., perpendicular) with respect to the geometric planes defined by the layers. The circular-spiraled layers of a cylindrical cell define curved geometric planes that are approximately parallel to each other. The flattened-spiraled layers or stacked layers of a prismatic cell define flat geometric planes that are approximately parallel to each other. The out-of-plane direction comports with the radial direction for a cylindrical cell, and to the crosswise direction for a prismatic cell.

A conventional cylindrical cell is characterized by a spirally wound electrode. Heat transport in the radial direction of a conventional cylindrical cell is inhibited by the spiral-wound insulative layering of its jelly-roll electrode. The in-plane direction of a cylindrical cell is in the generally circumferential direction of the electrode winding. The out-of-plane direction of a cylindrical cell is in the generally radial direction of the electrode winding. In a cylindrical cell, the radial direction is the direction that approximately perpendicularly cuts across the circumferentially layered winding.

A conventional prismatic cell is characterized by either a stack configuration or a flattened jelly-roll configuration. A stack configuration has a plurality of adjacent parallel planar electrodes. A flattened jelly-roll configuration describes an oblong spirally wound electrode having a plurality of adjacent parallel planar sections that are analogous to stacked electrodes. The in-plane direction of a prismatic cell is in the generally planar direction of the electrode stack or of an oblong electrode jelly-roll's planar parallel sections, which correspond to the parallel planar directions of the respective individual electrodes in a stack. The out-of-plane direction of a prismatic cell is in the generally transverse direction of the electrode stack. In a prismatic cell, the transverse direction is the direction that approximately perpendicularly cuts across the planarly layered stack or planarly layered jelly-roll.

Inventive practice is possible with respect to practically any cell type that implements a layered electrode assembly. The present invention is applicable to practically any cell shape (cylindrical, prismatic, etc.) and practically any cell chemistry (lithium-ion, lead acid, etc.). The skilled artisan who reads the instant disclosure will appreciate that inventive practice is possible with respect to multifarious cell types and characteristics. Any electrochemical cell chemistry that relies on a layered electrode configuration to achieve a potential difference admits of inventive practice. Inventive practice can be especially propitious with respect to lithium-ion varieties of cylindrical battery cells. The present invention is frequently embodied as a uniquely constructed cylindrical Li-ion battery cell that affords superior heat dissipation.

Especially notable among the features of the present invention is its implementation of at least one high heat-conductivity plate (e.g., metal plate) that extends in the out-of-plane direction to the inside periphery within the cell casing. Each thermally conductive plate is oriented in the out-of-plane direction so that its entire perimeter is at least substantially contiguous with the interior wall of the battery's casing. An exemplary inventive cell device includes at least one thermally conductive plate, wherein each thermally conductive plate separates two electrode components.

Exemplary inventive practice provides for a thermally conductive (e.g., highly thermally conductive) plate that is approximately circular for cylindrical cell applications, and is approximately rectangular for prismatic cell applications. The thermally conductive plate, according to exemplary inventive practice, is rigid, flat, thin, uniform in thickness, and at least substantially coextensive with the cell casing in the out-plane-direction. For instance, the thermally conductive plate can be a metal plate made of copper or aluminum. A circular plate is synonymously referred to herein as a disk. According to exemplary inventive practice of a cell having a plurality of thermally conductive plates, the thermally conductive plates are approximately parallel to each other.

In an inventive cylindrical electrochemical cell, each thermally conductive circular plate is interposed between two jelly-roll electrode components. The term "jelly-roll electrode component" (or in shortened form, "jelly-roll component") is used herein to refer to one of the present invention's plural discrete jelly-roll electrodes that are axially aligned and are separated therebetween by thermally conductive circular plates (disks). In an inventive prismatic electrochemical cell, each thermally conductive rectangular plate is interposed between two electrode stack components.

The term "electrode stack component" (or in shortened form, "stack component") is used herein to refer to one of the present invention's plural discrete electrode stacks that are axially aligned and are separated therebetween by thermally conductive rectangular plates.

An inventive cell device includes at least one thermally conductive plate and at least two electrode components. Inventive electrochemical cell devices may be variously embodied as having one or practically any plural number of thermally conductive plates, and having practically any plural number of jelly-roll components or stack components. Accordingly, inventive practice of a jelly-roll configured cell provides that the minimum number of thermally conductive plates is one, and the minimum number of jelly-roll components is two. Similarly, inventive practice of a stack-configured cell provides that the minimum number of thermally conductive rectangular plates is one, and the minimum number of stack components is two. In any given inventive cell device, the number of electrode components (e.g., jelly-roll components or stack components) is one more than the number of thermally conductive plates (e.g., circular plate or rectangular plate).

In a sense, the plural electrode components (e.g., jelly-roll components or stack components) of an exemplary inventive cell constitute an overall electrode component (e.g., an overall jelly-roll component or an overall stack component). Each thermally conductive plate is installed, in "cross-cutting" fashion, perpendicularly across the layers of the overall electrode component. Otherwise expressed, each thermally conductive plate is installed contiguously between two coaxial electrode components so as to lie in a geometric plane that is perpendicular to the longitudinal axis of the overall electrode component.

As compared with previous thermal management approaches, the present invention better succeeds in keeping a cell in good thermal communication with the surrounding environment. Inventive practice improves safety and reliability of a cell and makes thermal management of the cell less challenging. By extending a thermally conductive component out-of-plane rather than in-plane, the present invention effectively provides a "short-circuit" for the heat to travel outward, full-circumference or full-perimeter, from the centermost region of the cell. The inventive device thus significantly enhances the ability of an electrochemical cell to shed heat; the increased heat transfer improves safety and reliability during operation of the electrochemical cell.

This application bears some relation to co-pending U.S. nonprovisional application Ser. No. 14/242,974, incorporated herein by reference, filing date 2 Apr. 2014, invention entitled "Device for Simulating Thermal Characteristics of a Lithium-Ion Battery," sole inventor Jason K. Ostanek.

BRIEF DESCRIPTION OF THE DRAWINGS

The present invention will now be described, by way of example, with reference to the accompanying drawings, wherein like numbers indicate same or similar elements or constituents, and wherein:

FIG. 1 amplifies FIG. 2B of the aforementioned U.S. Pat. No. 7,442,465 B2 to Kim et al., e.g., by indicating the in-plane direction (A) and the out-of-plane direction (B) of the cylindrical electrochemical cell.

FIG. 2 shows a thermally conductive disk placed between two jelly-roll sections.

FIG. 6 through FIG. 11 are simplified perspective views of various examples of electrochemical cells having one or more thermally conductive plates in accordance with the present invention. FIGS. 6 through 8 illustrate placement of one (FIG. 6), two (FIG. 7), or three (FIG. 8) thermally conductive circular plates in an inventive cylindrical cell. FIGS. 9 through 11 illustrate placement of one (FIG. 9), two (FIG. 10), or three (FIG. 11) thermally conductive rectangular plates in an inventive prismatic cell.

FIG. 12 shows an example of thermal conductivity through a thermally conductive disk disposed in an out-of-plane direction that corresponds to the radii of a spirally wound, approximately axisymmetric electrode of an inventive cylindrical cell. FIG. 13 shows an example of thermal conductivity in a direction that corresponds to the perpendicular intersections of the planar parallel electrode layers of an inventive stack-configured prismatic cell. FIG. 14 shows an example of thermal conductivity in a direction that corresponds to the perpendicular intersections of the planar parallel electrode sections of an inventive jelly-roll-configured prismatic cell.

DESCRIPTION OF EXEMPLARY
EMBODIMENTS OF THE INVENTION

Figure 1:
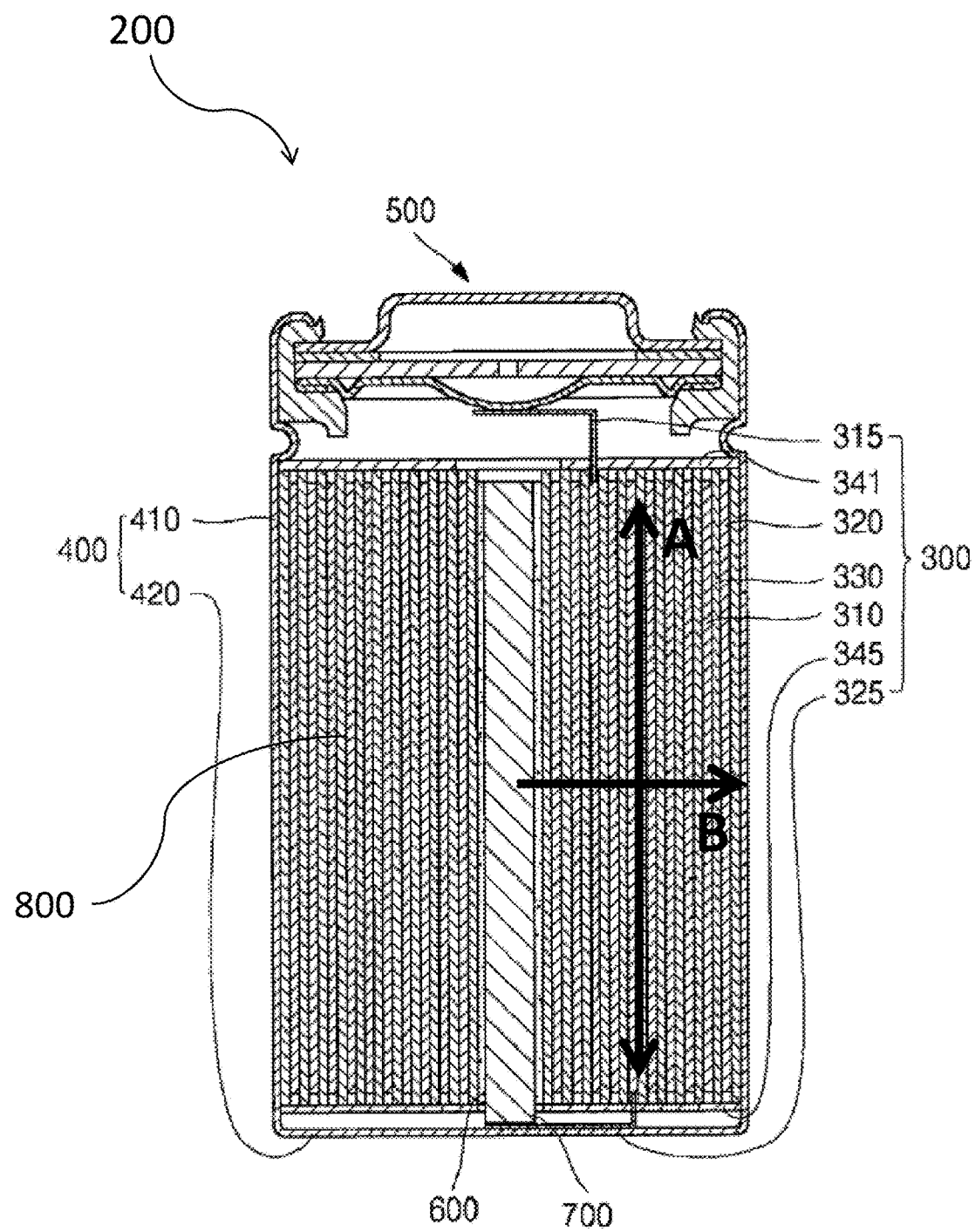
FIG. 1 is a cross-sectional elevation view of an example of a conventional cylindrical electrochemical cell.

Referring now to FIG. 1, a typical conventional secondary electrochemical (e.g., lithium-ion) cell device 200 includes electrode assembly 300, battery case 400, end caps 420 and 500, electrolyte (e.g., liquid electrolyte) 600, and mandrel 700. Electrode assembly 300 includes anode 310, insulating separator 320, cathode 330, positive electrode tab 315, negative electrode tab 325, first insulation layer 341, and second insulation layer 345. Anode layer 310, insulating separator layer 320, and cathode layer 330 are rolled up together to form the electrode jelly-roll 800. Battery case 400 includes a side wall 410 and a bottom wall 420, and is made of an electrically conductive material such as a metal material. FIG. 1 indicates in-plane direction A and out-of-plane direction B.

Kim et al. refer to their mandrel 700 as a "solid deformation prevention core." As conventionally understood in the art, an axial-longitudinal device similar to mandrel 700 shown in FIG. 1 can serve a thermally conductive purpose. For instance, a solid or hollow metal rod like mandrel 700 can act to take heat from the central portion of conventional cell 200 by conducting heat in in-plane direction A (up-and-down, as shown in FIG. 1) toward end caps 420 and 500.

From a heat-transfer point of view, a major problem with a cell construction such as shown in FIG. 1 is the difficulty for heat to travel outward from the central axis of the cell toward the circumferential (cylindrical) outer casing. The radial heat travel is physically discouraged because the heat has to travel across several or many layers, and the interfacial resistance at each layer prohibits or impedes heat transfer. In addition, the separator layer 320 included in jelly-roll 800 is typically a plastic-type material that does not conduct heat well. As compared with heat transfer proceeding radially out of the axis (e.g., as defined by vertical mandrel 700 shown in FIG. 1) of the cell, heat transfer along the axis of the cell is not as prohibitive because the anode and cathode (310 and 330) have appreciable thermal conductivity. Therefore, for these conventional types of cylindrical electrochemical cells, heat is conducted well in the axial direction (i.e., in-plane direction A), but not well in the radial direction (i.e., in out-of-plane direction B).

Figure 2:
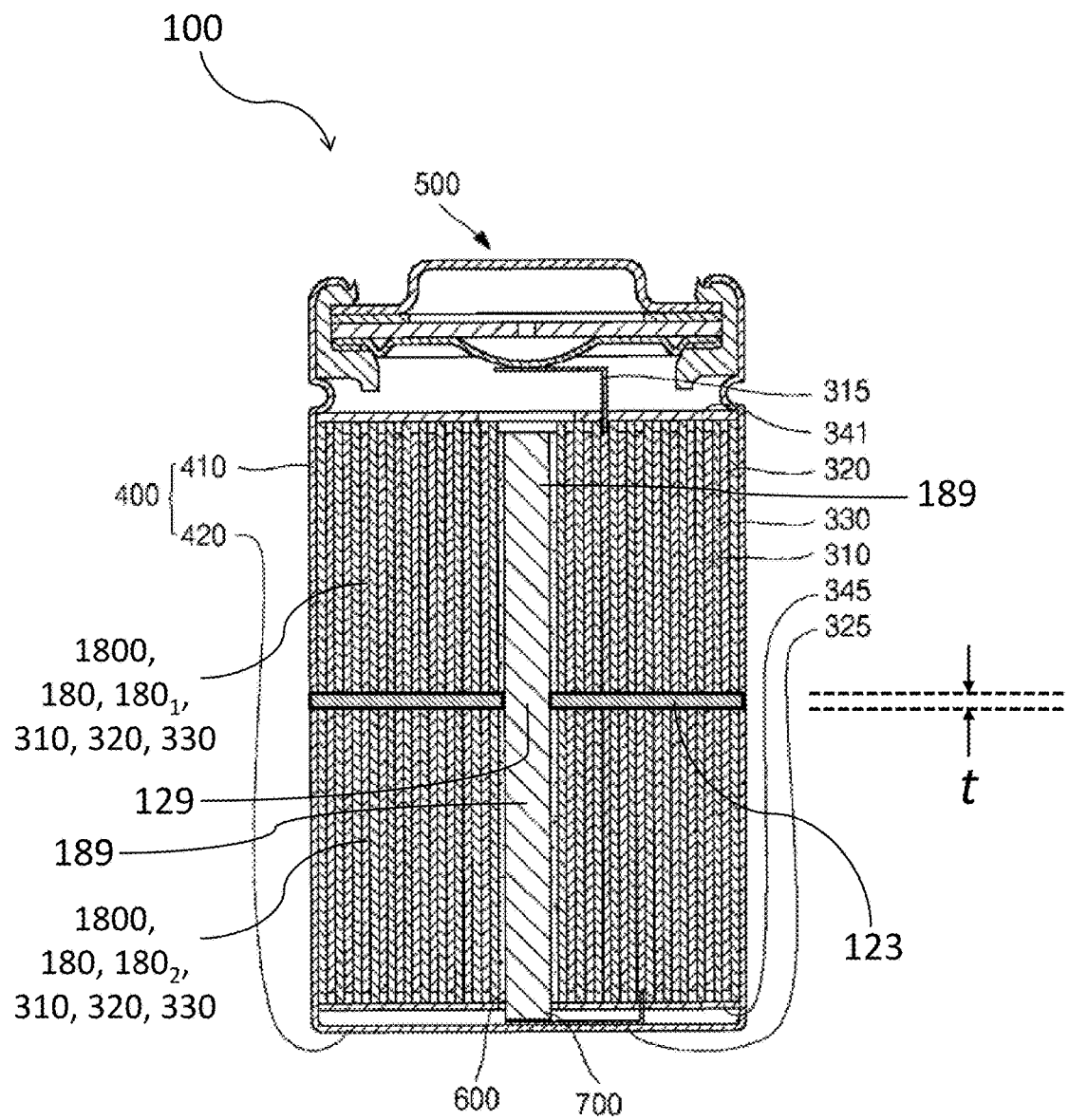
FIG. 2 is a cross-sectional elevation view, similar to the view of FIG. 1, of an example of a cylindrical electrochemical cell in accordance with the present invention. In particular.

With reference to FIG. 2, exemplary inventive cylindrical cell 100 affords superior heat transfer characteristics. Like conventional cylindrical cell 200, inventive cylindrical cell 100 is capable of transferring heat along the axial (in-plane) direction A of cylindrical cell 100. Similarly as can conventional cell 200, inventive cell 100 can augment thermal conductance, via a solid or hollow rod-like member or device such as mandrel 700, along the axial (in-plane) direction A of the cell. Note that, even in the absence of a heat-transfer augmentation device such as mandrel 700, thermal conductance in in-plane direction A tends to be significantly greater than thermal conductance in out-of-plane direction B.

Unlike conventional cylindrical cell 200, inventive cylindrical cell 100 is also capable of transferring heat along the radial (out-of-plane) direction B of cylindrical cell 100. As distinguished from conventional cell 200, inventive cell 100 augments thermal conductance by increasing heat transfer capability along the radial (out-of-plane) direction B of the cell. A thermally conductive (e.g., metal) disk 123 is inserted into the conventional cell 200 shown in FIG. 1 to form the inventive cell 100 shown in FIG. 2. Thermally conductive (e.g., metal) disk 123 extends from the core 700 to the cylindrical sidewall 410 of the outer casing 400, and serves to improve heat transfer and provide added rigidity in the cell.

Conventional cylindrical cell 200 and inventive cylindrical cell 100 differently manifest a jelly-roll character. As shown in FIG. 2, inventive cell 100 has an overall jelly-roll system 1800 that is analogous to conventional cell 200's jelly-roll 800 shown in FIG. 1. As distinguished from the unitarily structured conventional jelly-roll 800, the inventive jelly-roll system 1800 includes two separate jelly-roll structures 180, viz., jelly-roll component 180$_1$ and lower jelly-roll component 180$_2$. More generally, depending on the inventive embodiment and subject to practical considerations, an inventive jelly-roll system 1800 can include any plural number of separate jelly-roll structures 180. Thermally conductive disk 123 is coaxially and contiguously interposed between jelly-roll component 180$_1$ and jelly-roll component 180$_2$. In a sense, the present invention's thermally conductive disk divides a conventional cell's single jelly-roll into two jelly-roll halves, and remains situated between the two jelly-roll halves whereby the two jelly-roll halves and the thermally conductive disk are axially aligned.

Figure 3:
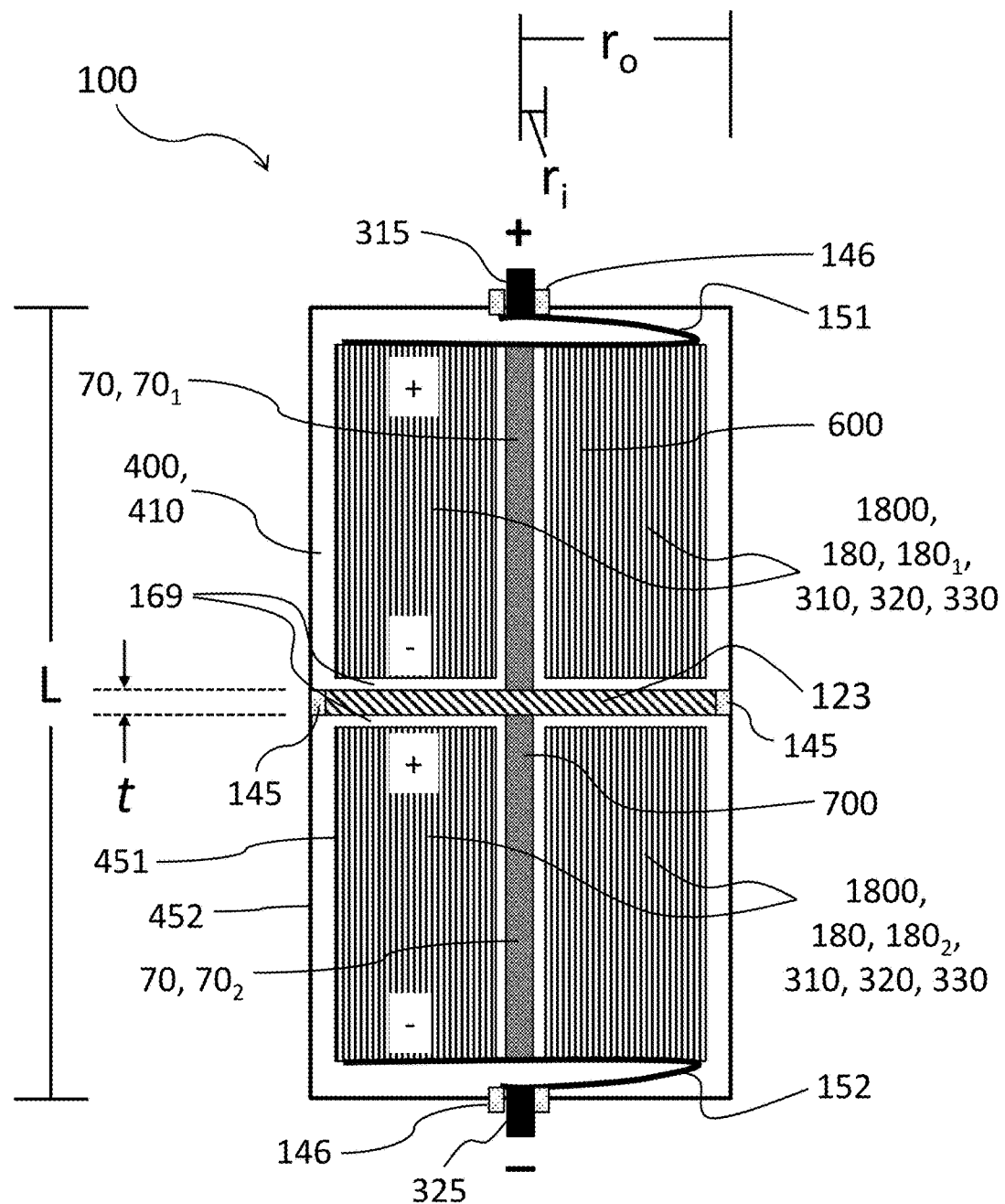
FIG. 3 is a cross-sectional elevation view of an example of a cylindrical electrochemical cell in accordance with the present invention, wherein two jelly-roll elements are connected in series.
Figure 4:
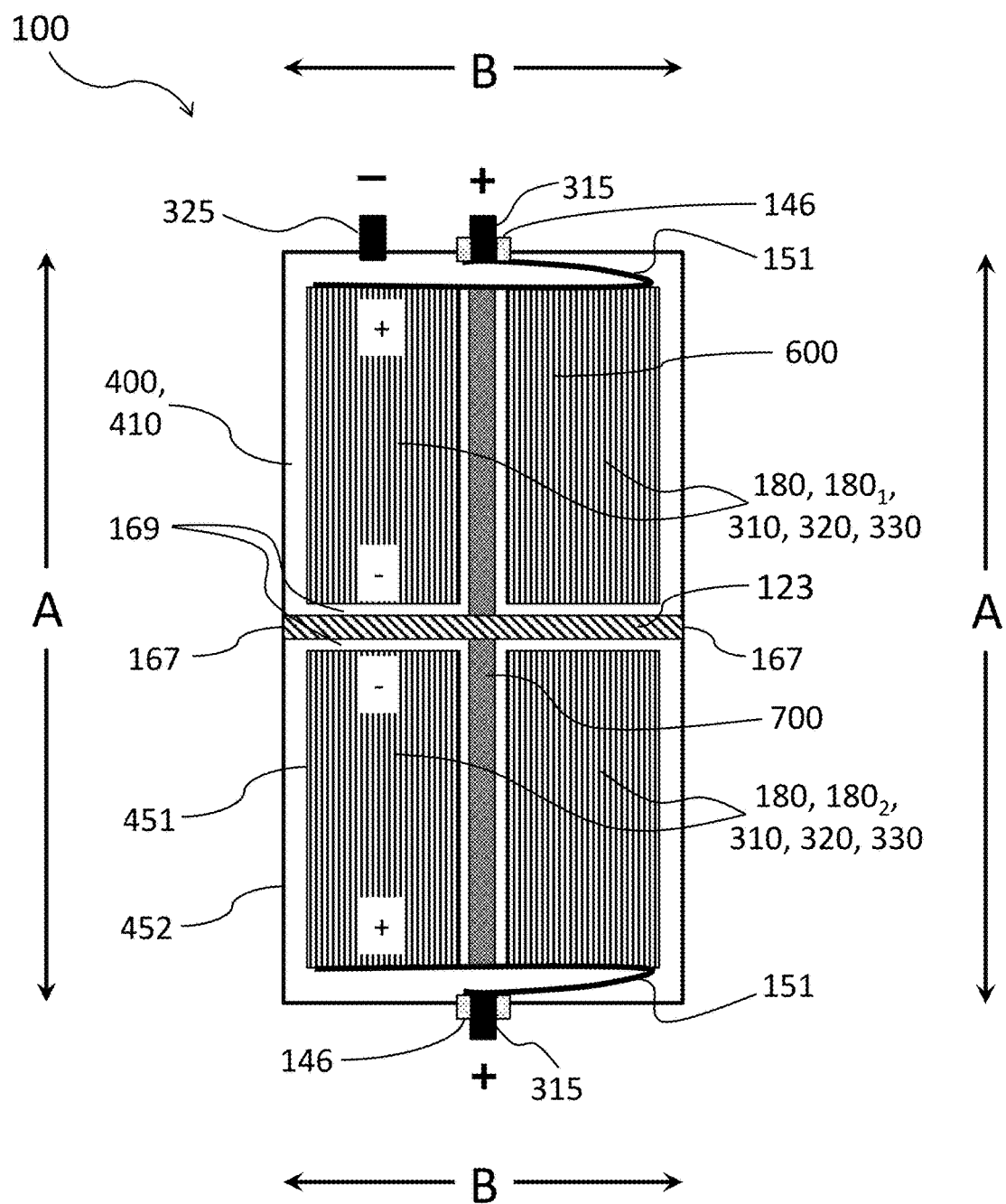
FIG. 4 is a cross-sectional elevation view of an example of a cylindrical electrochemical cell in accordance with the present invention, wherein two jelly-roll elements are connected in parallel so as to share a negative terminal.
Figure 5:
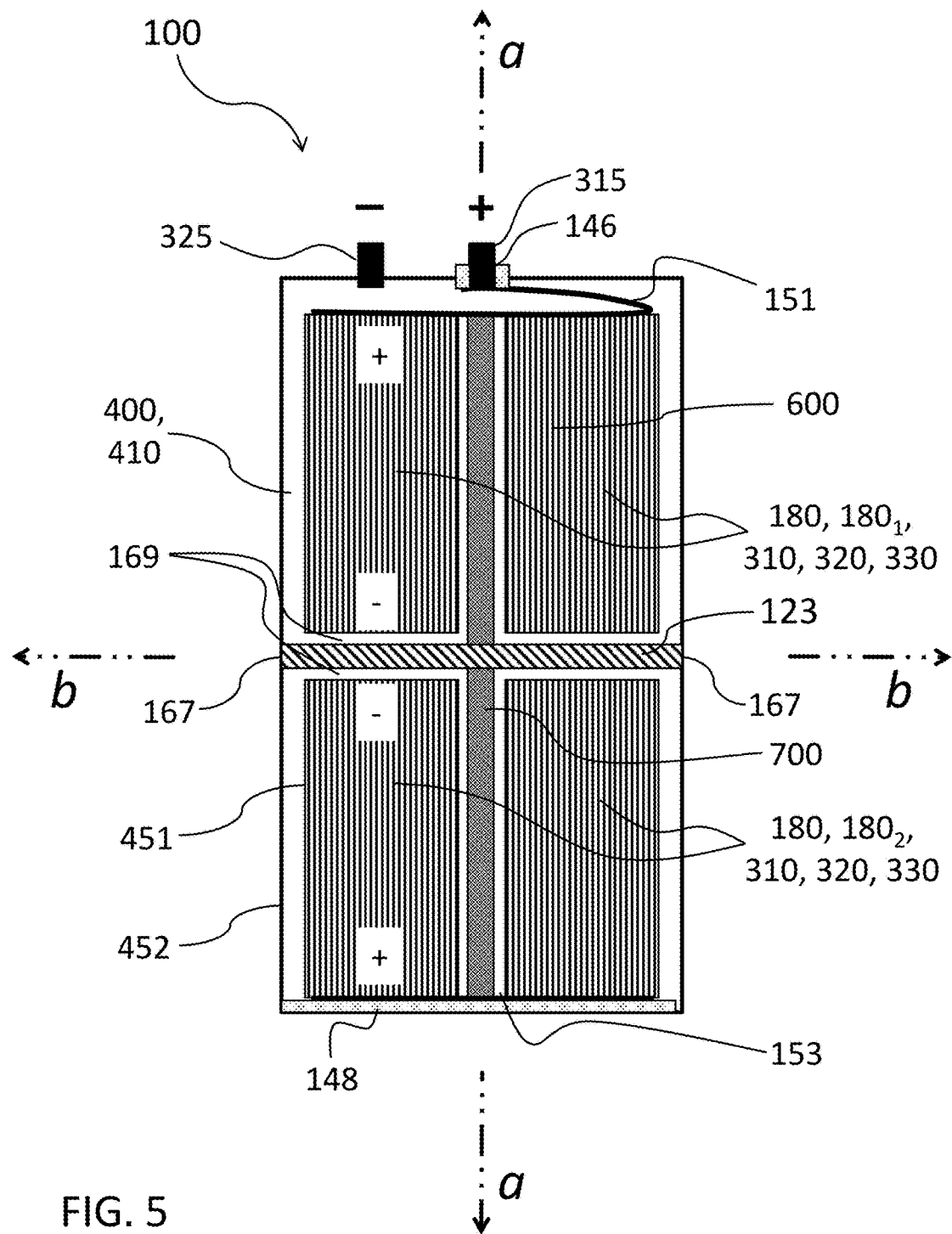
FIG. 5 is a cross-sectional elevation view of an example of a cylindrical electrochemical cell in accordance with the present invention, wherein two jelly-roll elements are connected in parallel so as to share both a positive terminal and a negative terminal.
Figure 12:
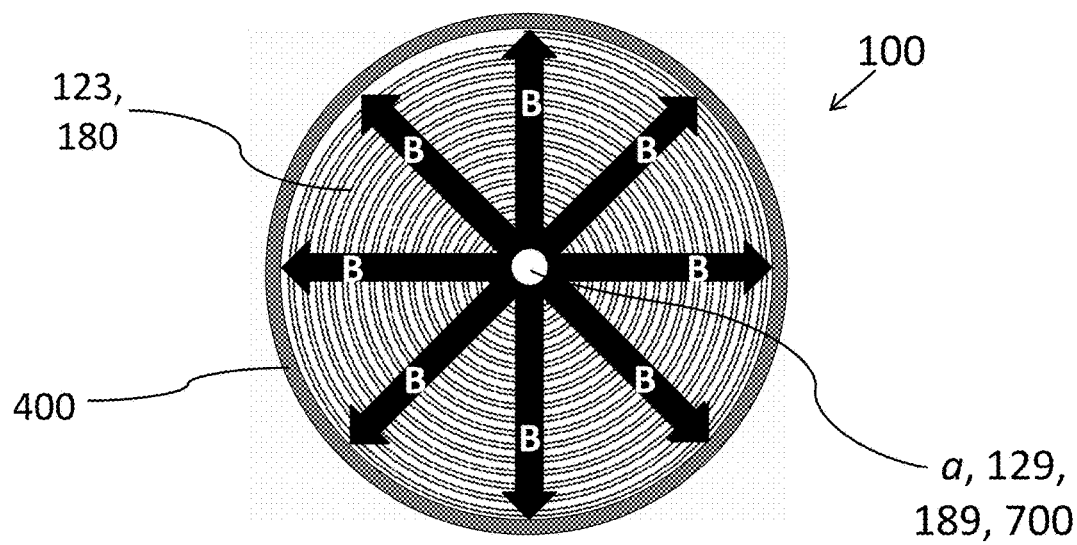
FIGS. 12 through 14 are simplified cross-sectional plan views illustrative of thermal dissipation, via thermal conductivity, in the out-of-plane direction of an inventive electrochemical cell.

Inventive practice providing for a combination including one or more thermally conductive plates and one or more thermally conductive mandrels can be variously configured. For instance, a thermally conductive plate can be either apertured or non-apertured (solid or continuous). Thermally conductive disk 123 shown in FIG. 2 has a central void 129 through which a single mandrel 700 perpendicularly passes. In contrast, FIGS. 3 through 5 show a solid disk 123 which separates two mandrel sections 70 of overall mandrel 700, viz., an upper mandrel section 70$_1$ and a lower mandrel section 70$_2$. Regardless of the configuration of the disk(s) and mandrel(s), it is frequently preferred inventive practice to have each disk in contact with the mandrel in order to promote thermal conductivity. For instance, a mandrel that passes through a disk's central void should contact the inside periphery of the void. Alternatively, a disk that separates two mandrel sections should contact an end of each mandrel section.

An inventive cylindrical cell 100 such as shown in FIGS. 2 through 5 and a conventional cylindrical cell 200 such as shown in FIG. 1 have certain dimensional characteristics in common. For instance, each cylindrical cell is characterized by a length L and an outer radius $r_o$. Outer radius $r_o$ is the circle radius extending from central axis a to the outside surface of casing 400. Length L is the distance, along the longitudinal central axis a, between the top outside surface of casing 400 and the bottom outside surface of casing 400. As distinguished from conventional cell 200, however, inventive cell 100 also includes a thermally conductive plate 123, which is characterized by a plate thickness t. Plate 123 is approximately uniform in thickness; its thickness t is the distance between its upper plate surface and its lower plate surface.

FIGS. 2 through 5 depict, in a cylindrical cell, inventive implementation of an out-of-plane thermally conductive plate, in conjunction with conventional implementation of a central in-plane thermally conductive member such as a solid or hollow rod or mandrel. Inventive practice may be especially propitious when it combines (i) inventive augmentation of crosswise (out-of-plane) thermal dissipation, and (ii) conventional augmentation of longitudinal-axial (in-plane) thermal dissipation. This combination of old art with the present invention's new art can improve thermal dissipation in both the in-plane (old) and out-of-plane (new) directions. Nevertheless, it is to be understood that the present invention can be practiced for achieving out-of-plane thermal dissipative enhancement in the absence of another structure or device for achieving in-plane thermal dissipative enhancement.

With reference to FIG. 3 through FIG. 5, inventive cylindrical cell 100 includes an outer (exterior) casing 400, a positive terminal 315, a negative terminal 325, a positive current collector 151, a negative current collector 152, an electrolyte (e.g., fluid) 600, a mandrel 700, a thermally and electrically conductive disk 123, a first jelly-roll component 180$_1$, a second jelly-roll component 180$_2$. According to exemplary inventive practice, casing 400 has an electrically conductive (e.g., metal) composition. Current collection and current collectors such as 151 and 152 can be implemented by the present invention in accordance with known methods and techniques. According to frequent inventive practice, metal is a preferred material for disk 123. The two individual jelly-roll components 180$_1$ and 180$_2$ together constitute an overall jelly-roll system 1800.

Casing 400 has an inside casing surface 451 and an outside casing surface 452. The diameter of thermally conductive plate 123 is approximately equal to the diameter of casing 400. As shown in FIG. 3, thermally conductive plate 123 is at least substantially coextensive with inside casing surface 451; in FIG. 3, as insulator 145 electrically insulates metal disk 123 from side wall 410 of cell case 400. As shown in FIGS. 2, 4, and 5, thermally conductive plate 123 is at least substantially coextensive with outside casing surface 452. As shown in FIGS. 2 through 5, each jelly-roll component 180 is at least substantially coextensive with inside casing surface 451.

Three modes of inventive practice are illustrated respectively in FIG. 3, FIG. 4, and FIG. 5. These three inventive modes represent three different ways of electrically configuring two spiral-layered electrode windings and a thermally conductive metal disk therebetween. In exemplary inventive practice such as represented by these modes, the plate is not only thermally conductive but is also electrically conductive. In each inventive mode, the plate 123 is electrically connected to each of the two jelly-roll components $180_1$ and $180_2$. Jelly-roll components $180_1$ and $180_2$ can be connected to plate 123, for example at connection locations 169, by implementing known methods and techniques for effecting electrical connection.

FIG. 3 shows electrical connection of two jelly-roll components $180_1$ and $180_2$ in series. FIG. 4 shows electrical connection of two jelly-roll components $180_1$ and $180_2$ in parallel whereby they share a negative terminal 325. FIG. 5 shows electrical connection of two jelly-roll components $180_1$ and $180_2$ in parallel whereby they share a positive terminal 315 and a negative terminal 325. The skilled artisan who reads the instant disclosure will appreciate that there are other possible modes of inventive practice, for instance combining inventive principles from among the three modes shown in FIGS. 3 through 5, and/or applying inventive principles to cells having two or more thermally conductive plates and three or more jelly-roll components.

As shown in FIG. 3, jelly-roll components $180_1$ and $180_2$ are connected in series. FIG. 3 represents a frequently preferred mode of inventive practice. Thermally conductive metal disk 123 is used as a common junction between jelly-roll components $180_1$ and $180_2$. The inventive cell 100 of FIG. 3 has one positive terminal 315 and one negative terminal 325. The terminal voltage is proportional to the number of jelly-roll components 180 that are arranged in series in inventive cell 100. The two jelly-roll components $180_1$ and $180_2$ are connected in series whereby the anode 310 of jelly-roll component $180_2$ is in contact with negative terminal 325, the cathode 330 of jelly-roll component $180_2$ is in contact with the metal disk 123, the anode 310 of jelly-roll $180_1$ is in contact with metal disk 123, and the cathode 330 of jelly-roll $180_1$ is in contact with positive terminal 315. Metal disk 123 is insulated via insulator 145 (e.g., an annular insulative member) from cell casing 400. Positive terminal 315 and negative terminal 325 are insulated from cell casing 400 via insulator 146. In this arrangement, the cell casing 400 is kept electrically neutral. The inventive configurative mode shown in FIG. 3 provides for the jelly-roll components 180 to be connected in series, where the terminal voltage of the inventive cell 100 will be proportional to the total number of jelly-roll components 180 that are installed within the inventive cell 100.

As shown in FIG. 4, two jelly-roll components $180_1$ and $180_2$ are connected in parallel. Each jelly-roll component 180 has its own unique positive terminal 315. The two jelly-roll components $180_1$ and $180_2$ share a common negative terminal 325. The respective anodes (negative polarity) 310 of jelly-roll components $180_1$ and $180_2$ are electrically connected to the metal disk 123, which is in electrical contact with the negative terminal 325. The two jelly-roll components 180 are connected in parallel whereby the anode 310 of jelly-roll $180_2$ is in contact with metal disk 123, the cathode 330 of jelly-roll $180_2$ is in contact with the positive terminal 315 at the bottom of cell 100, the anode 310 of jelly-roll component $180_1$ is in contact with metal disk 123, and the cathode 330 of jelly-roll component $180_1$ is in contact with the positive terminal 315 at the top of cell 100. Metal disk 123 is in electrical contact with the cell casing 400 (at contact location 167) as well as the negative terminal 325. Positive terminal 315 at the top of the cell 100 is insulated from case 400 via insulator 146. Positive terminal 315 at the bottom of the cell 100 is insulated from case 400 via insulator 146. The inventive configuration shown in FIG. 4 provides for the jelly-roll components 180 to be connected in parallel, wherein each jelly-roll component 180 has its own unique positive terminal 315, but both jelly-roll components 180 share a common negative terminal 325. The inventive configurative mode shown in FIG. 4 provides for the jelly-roll components 180 to be connected in parallel, where the capacity of the inventive cell 100 will be proportional to the total number of jelly-roll components 180 that are installed within the inventive cell 100.

FIGS. 4 and 5 illustrate similar inventive embodiments insofar as each embodiment is characterized by parallel electrical connection of two jelly-roll components 180. As shown in FIG. 5, two jelly-roll components $180_1$ and $180_2$ are connected in parallel whereby both jelly-rolls 180 share a common set of positive and negative terminals. The respective anodes (negative polarity) 310 of jelly-roll components $180_1$ and $180_2$ are electrically connected to metal disk 123, which is in electrical contact with negative terminal 325. Similarly as shown in FIG. 4, metal disk 123 is in electrical contact with the cell's outer casing 400 at contact location 167. The two jelly-roll components $180_1$ and $180_2$ are connected in parallel whereby anode 310 of jelly-roll component $180_2$ is in contact with metal disk 123, cathode 330 of jelly-roll component $180_2$ is in contact with mandrel 700, anode 310 of jelly-roll component $180_1$ is in contact with metal disk 123, and cathode 330 of jelly-roll component $180_1$ is in contact with positive terminal 315 at the top of cell 100. Metal disk 123 is in electrical contact with cell casing 400 as well as negative terminal 325. Mandrel 700 is in electrical contact with positive terminal 315. Positive terminal 315 is insulated from case 400 via insulator 146. Insulation 148 prevents cathode 330 of jelly-roll component $180_2$ from shorting on casing 400. The inventive configuration shown in FIG. 5 provides for the jelly-roll components 180 to be connected in parallel, wherein both positive terminal 315 and negative terminal 325 are shared by jelly-roll components $180_1$ and $180_2$. The inventive configurative mode shown in FIG. 5 provides for the jelly-roll components 180 to be connected in parallel, where the capacity of the inventive cell 100 will be proportional to the total number of jelly-roll components 180 that are installed within the inventive cell 100.

Still referring to FIGS. 2 through 5 and also referring to FIGS. 6 through 14, each thermally conductive plate 123 lies in a geometric plane b. Geometric longitudinal axis a perpendicularly intersects each geometric plane b. In inventive embodiments having plural plates 123, the corresponding planes b are parallel to each other and are each perpendicular to axis a. The cylindrical inventive devices shown in FIGS. 2 through 8 and 12 are each characterized by a geometric axis a. The prismatic inventive devices shown in FIGS. 9 through 11, 13, and 14 are each characterized by plural parallel geometric planes e, wherein each of the parallel planar electrodes or electrode portions of jelly-roll or stack 180 lies in a geometric plane e. Each cylindrical cell 100 has at least two jelly-roll electrode components 180. Each prismatic cell 100P has at least two stack electrode components 180.

Figure 13:
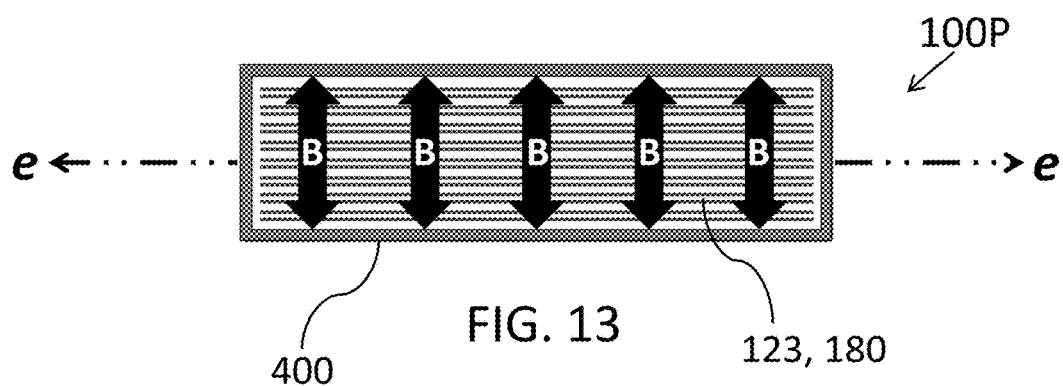
Figure 14:
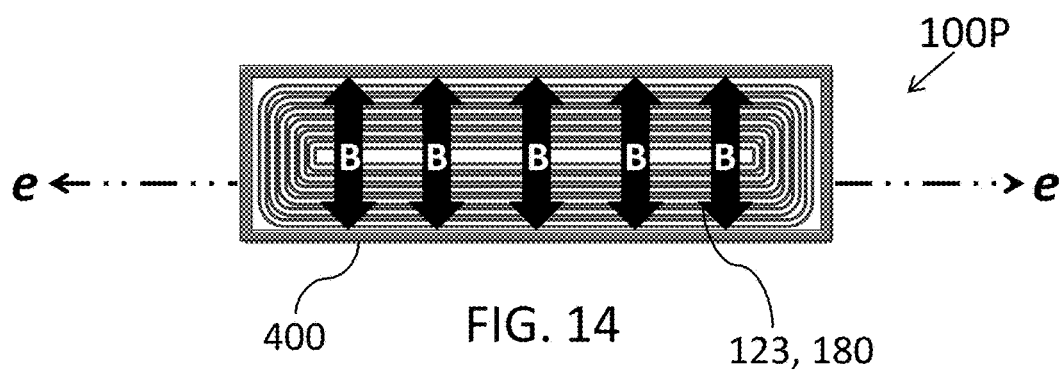

An inventive cell's transmission of heat in direction A is through the cell's length L. An inventive cell's transmission of heat in direction B is augmented by addition of a plate or plates 123, each of which defines a plane b. Each plane b is perpendicular to cylindrical cell 100's geometric axis a, or is perpendicular to prismatic cell 100P's parallel geometric planes e. Note that FIG. 13 shows an electrode stack 180, whereas FIG. 14 shows a flattened electrode jelly-roll 180. A stacked electrode configuration (such as shown in FIG. 13) and a flattened jelly-roll electrode configuration (such as shown in FIG. 14) are similar in inventive principle insofar as direction B is perpendicular to parallel geometric planes defined by electrodes or electrode portions.

Depending on the inventive embodiment, inventive cylindrical cell 100 can have one disk 123, or a plurality of disks 123. For instance, FIG. 6 shows one disk 123; FIG. 7 shows two disks 123₁ and 123₂; FIG. 8 shows three disks 123₁, 123₂, and 123₃. Similarly, inventive prismatic cell 100P can have one disk 123, or a plurality of disks 123. For instance, FIG. 9 shows one disk 123; FIG. 10 shows two disks 123₁ and 123₂; FIG. 11 shows three disks 123₁, 123₂, and 123₃. According to exemplary inventive practice, each thermally conductive plate 123 is located adjacent to and intermediate two electrode components (e.g., jelly-roll components) 180; therefore, the number of electrode components 180 is one greater than the number of thermally conductive plates 123. According to exemplary inventive practice, regardless of the respective numbers of thermally conductive plates 123 and electrode components 180, each thermally conductive plate 123 is in direct electrical connection with the two electrode components 180 between which the thermally conductive plate 123 is interposed.

In a cylindrical cell, out-of-plane direction B is the radial direction. Calculations can be performed to estimate the ability of a cylindrical electrochemical cell to transfer heat in in-plane direction A (in the axial direction, coplanar with respect to the jelly-roll winding of the cylindrical cell) and out-of-plane direction B (in the radial direction, cross-planar with respect to the jelly-roll winding of the cylindrical cell). Equations (1) and (2), below, may be used to calculate the thermal resistance of a conventional cylindrical cell such as shown in FIG. 1. Equations (1) and (2) serve as a first-order approximation, as they are derived for steady-state conduction through a cylindrical wall with no internal heat generation. Equation (1) obtains the out-of-plane thermal resistance, $R_{radial}$. Equation (2) obtains the in-plane thermal resistance, $R_{axial}$. The outer radius of the cell is $r_o$. The inner radius of the cell is $r_i$, which is defined herein as the circle radius extending from central axis a (such as shown in FIG. 5) to the outside surface of mandrel 700. The length of the cell is L. The radial thermal conductivity of the cell is $k_{radial}$. The axial thermal conductivity of the cell is $k_{axial}$.

$$R_{radical} = \frac{\ln(r_o/r_i)}{\pi k_{radial} L} \quad \text{Eq. (1)}$$

$$R_{axial} = \frac{L/2}{k_{axial} \pi r_o^2} \quad \text{Eq. (2)}$$

By way of example, Equations (1.1) and (2.1) show the computational results for a conventional cylindrical electrochemical cell (such as shown in FIG. 1) having a 50 mm outer diameter, a 4 mm inner diameter, and a 200 mm length. In this example, the axial and radial thermal conductivity values are assumed to be 30 W/m-K and 1 W/m-K, respectively, which are consistent with previous observation by the present inventor.

$$R_{radial} = \frac{\ln(0.025/0.002)}{\pi \cdot 1 \cdot 0.2} = 4.0 \quad \text{Eq. (1.1)}$$

$$R_{axial} = \frac{0.2/2}{30 \cdot \pi \cdot 0.025^2} = 1.7 \quad \text{Eq. (2.1)}$$

The higher is the thermal resistance, the worse is the thermal conductance. Conversely, the lower is the thermal resistance, the better is the thermal conductance. Note that the out-of-plane thermal resistance $R_{radial}$ calculated in Equation (1.1) is 4.0; this thermal resistance value is high, and hence is not good in terms of thermal dissipation. On the other hand, the in-plane thermal resistance conductivity $R_{axial}$ using calculated in Equation (2.1) is 1.7; this thermal resistance value is low, and hence is good in terms of thermal dissipation. Equations (1.1) and (2.1) exemplify an electrochemical cell in which the thermal resistance in the radial direction is more than twice the thermal resistance in the axial direction.

Exemplary inventive practice features a thermally conductive (e.g., metal) plate such as plate 123 shown in FIGS. 2 through 5 and 12 through 14. Thermally conductive plate 123 extends, in out-of-plane direction B, through the interior of inventive cell 100 approximately to its interior periphery. Equation (1), above, represents the radial thermal resistance in a conventional cylindrical cell. The conventional cell's radial thermal resistance $R_{radial}$ is associated only with the windings of the jelly-roll. Equation (3), below, represents the radial thermal resistance $R_{radial-inv}$ in an inventive cylindrical cell.

Most of the nomenclature is the same in Equations (1), (2), and (3). The outer radius of the cell is $r_o$. The inner radius of the cell is $r_i$. The length of the cell is L. The radial thermal conductivity of the cell is $k_{radial}$. As distinguished from Equation (1), Equation (3) introduces an additional type of radial thermal conductivity, viz., that of the thermally conductive disk. The inventive cell's radial thermal resistance $R_{radial-inv}$ is associated with the windings of the plural jelly-roll components and with the thermally conductive disk. That is, calculation of the radial thermal resistance of an inventive cell takes into consideration a combination of two types of radial thermal conductivity: (i) radial thermal conductivity through the jelly-roll components; and, (ii) radial thermal conductivity through the inventive thermally conductive disk.

$$R_{radial-inv} = \frac{1}{\frac{\pi k_{radial} L_{winding}}{\ln(r_o/r_i)} + \frac{\pi k_{metal} L_{metal}}{\ln(r_o/r_i)}} \quad \text{Eq. (3)}$$

The axial thermal conductivity of the cell is $k_{axial}$. Equation (1) provides for one value of thermal conductivity, viz., $k_{radial}$. In contrast to Equation (1), Equation (3) provides for two values of thermal conductivity, viz., $k_{radial}$ and $k_{metal}$. In Equation (3), $k_{radial}$ denotes the radial thermal conductivity of the jelly-roll components; $k_{metal}$ denotes the radial thermal conductivity of the thermally conductive (e.g., metal) disk. Equivalently in Equations (2) and (3), thermal conductivity $k_{radial}$ refers to the thermal conductivity of the jelly-roll windings.

In comparison with a conventional cell, an inventive electrochemical cell can significantly decrease the radial thermal resistance of the cell, and can therefore afford significantly better thermal dissipation than can a conventional electrochemical cell. By way of example, Equation (3.1), below, uses Equation (3) to calculate inventive radial thermal resistance $R_{radial-inv}$ assuming a copper disk of thickness 4 mm. As in Equations (1) and (2), in Equation (3) the outer cell diameter is 50 millimeters, the inner cell diameter is 4 millimeters, and the cell length is 200 millimeters. Equation (3.1) gives a value for $R_{radial-inv}$ of 0.45; in contrast, Equation (2.1) gives a value for $R_{radial}$ of 4.0.

$$R_{radial-inv} = \frac{1}{\frac{\pi \cdot 1 \cdot 0.196}{\ln(0.025/0.002)} + \frac{\pi \cdot 400 \cdot 0.004}{\ln(0.025/0.002)}} = 0.45 \quad \text{Eq. (3.1)}$$

Accordingly, based on the example provided by Equation (3.1), inventive practice can reduce an electrochemical cell's thermal resistance in the radial direction by about one order of magnitude. Note that inventive practice can achieve quite superior thermal dissipation with minimal decrease in cell volume. In this example, the length L of the cell is 200 millimeters, and the thickness t of the thermally conductive disk is 4 millimeters. Hence, the thermally conductive disk takes up only about two percent (2%) of the volume of the cylindrical container (casing).

Generally speaking, the "capacity" of an electrochemical cell is the amount of electric charge that the cell can deliver at a rated voltage. A cell's capacity depends on, inter cilia, the amount of electrode material contained in the cell. The greater is the volume of the cell, the greater is the amount of electrode material that the cell can contain. Therefore, assuming that two electrochemical cells have the same chemistry, the larger cell (i.e., the cell with the greater volume) has a greater capacity than the smaller cell (i.e., the cell with the lesser volume). These properties and relationships may be kept in mind by an inventive practitioner who selects a thickness t of a thermally conductive plate 123, or who selects corresponding thicknesses t of plural thermally conductive plates 123. For instance, the volume of a cell of a given length L is reduced by an increased sum of corresponding thicknesses t of plural plates 123, as each thickness t is measured along length L.

The inventive practitioner can consider the relation of plate thickness t to two characteristics, viz.: (i) cell capacity; and, (ii) radial thermal resistance, such as given by Equation (3). The thermal dissipativity of a cell increases with decreasing radial thermal resistance. Accordingly, in deciding upon plate dimensions, the cell capacity decrease that is associated with plate thickness increase (and hence with cell volume decrease) can be balanced against the radial thermal resistance decrease that is associated with plate thickness increase (and hence with cell volume decrease). Some inventive embodiments implement a computer and a computer display to facilitate decision-making regarding thickness or thicknesses of one or more thermally conductive plates. For instance, an inventive algorithm can perform calculations and render comparisons (e.g., as represented by graphs or tables) between capacity and radial thermal resistance, with respect to different values or ranges of values of plate thickness.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. An electrochemical cell comprising at least one thermally conductive solid plate, at least two electrode components, at least two thermally conductive mandrel sections, and a casino, wherein:
   said casing is characterized by a cell length and contains said at least one thermally conductive solid plate and said at least two electrode components;
   each said thermally conductive solid plate is perpendicular to said cell length and is interposed between two said electrode components so as to entirely separate the two said electrode components;
   said casing is a cylindrical casing characterized by an axis along said cell length;
   each said electrode component is characterized by a spirally wound electrode configuration;
   each said thermally conductive solid plate is a disk that is perpendicular to said axis and that at least substantially extends to said cylindrical casino;
   said electrode components and said thermally conductive solid plate share said axis;
   each said spirally wound electrode has a central electrode void coincident with said axis;
   each said thermally conductive solid plate is interposed between and contacts two said thermally conductive mandrel sections so as to entirely separate the two said thermally conductive mandrel sections;
   each said thermally conductive mandrel section passes through a corresponding said central electrode void and contacts said thermally conductive solid plate;
   said thermally conductive mandrel sections, said electrode components, and said thermally conductive solid plate share said axis.

2. The electrochemical cell of claim 1 wherein said casing has an inside casing surface, and wherein each said thermally conductive solid plate is made of metal and at least substantially extends to said inside casing surface.

3. The electrochemical cell of claim 1 wherein said casing has an outside casing surface, and wherein each said thermally conductive solid plate is made of metal and at least substantially extends to said outside casing surface.

4. The electrochemical cell of claim 1 wherein each said thermally conductive solid plate is electrically conductive and is electrically connected to the two said electrode components between which said thermally conductive solid disk is interposed.

5. The electrochemical cell of claim 1, wherein said at least one thermally conductive solid plate is at least two thermally conductive solid plates, and wherein said at least two electrode components is at least three electrode components.

6. The electrochemical cell of claim 1, wherein:
   the number of said at least two electrode components exceeds by one the number of said at least one thermally conductive solid plate;
   each said thermally conductive solid plate is characterized by a thickness;
   at least two said thermally conductive solid plates are respectively characterized by different said thicknesses.

7. The electrochemical cell of claim 6, wherein said at least one thermally conductive solid plate is at least two thermally conductive solid plates, and wherein said at least two electrode components is at least three electrode components.

8. An electrochemical battery device comprising:
a cylindrical case having a geometric longitudinal axis;
two spirally wound electrode components;
a solid disk;
a first positive terminal;
a second positive terminal;
a negative terminal;
a first positive current collector; and
a second positive current collector;
wherein said two spirally wound electrode components and said solid disk are coaxially arranged along said geometric longitudinal axis;
wherein said solid disk and said negative terminal are each in electrical contact with said case;
wherein said first positive terminal and said second positive terminal are each insulated from said case;
wherein said first positive current collector conducts electrical current, from one of said two spirally wound electrode components, to said first positive terminal;
wherein said second positive current collector conducts electrical current, from the other of said two spirally wound electrode components, to said second positive terminal;
wherein said solid disk: is thermally conductive and electrically conductive; is electrically connected to the two said spirally wound electrode components between which said thermally conductive solid disk is adjacently situated; is characterized by a disk thickness; at least substantially extends to said case; lies in a geometric disk plane that is perpendicular to said geometric longitudinal axis; and is adjacently situated between two said spirally wound electrode components whereby the two said spirally wound electrode components are completely apart from each other by a distance at least substantially commensurate with said disk thickness.

9. The electrochemical battery device of claim 8, wherein each said spirally wound electrode component includes an anode layer, a cathode layer, and an insulator layer.

10. An electrochemical battery device comprising:
a cylindrical case having a geometric longitudinal axis;
at least two spirally wound electrode components;
at least one thermally conductive solid disk; and
at least two thermally conductive mandrel elements, wherein:
said at least two spirally wound electrode components and said at least one thermally conductive solid disk are coaxially arranged along said geometric longitudinal axis;
each said spirally wound electrode component has an axial electrode hole;
each said thermally conductive solid disk is adjacently situated between and in contact with two said thermally conductive mandrel elements;
each said thermally conductive mandrel element is positioned inside said axial electrode hole and has two mandrel element ends whereby at least one said mandrel element end is in contact with a said thermally conductive solid disk;
said at least two thermally conductive mandrel elements, said at least two spirally wound electrode components, and said at least one thermally conductive solid disk are characterized by said geometric longitudinal axis;
the number of said at least two thermally conductive mandrel elements equals the number of said at least two spirally wound electrode components and exceeds by one the number of said at least one thermally conductive solid disk;
wherein each said thermally conductive solid disk is electrically conductive, is electrically connected to the two said spirally wound electrode components between which said thermally conductive solid disk is adjacently situated, is characterized by a disk thickness, at least substantially extends to said case, lies in a geometric disk plane that is perpendicular to said geometric longitudinal axis, and is adjacently situated between two said spirally wound electrode components whereby the two said spirally wound electrode components are completely apart from each other by a distance at least substantially commensurate with said disk thickness.

11. The electrochemical battery device of claim 10, further comprising a positive terminal, a negative terminal, a positive current collector, and a negative current collector, wherein:
said at least two spirally wound electrode components are two spirally wound electrode components;
said at least one thermally conductive solid disk is one thermally conductive disk;
said thermally conductive solid disk is electrically conductive and is insulated from said case;
said positive current collector conducts electrical current, from said two spirally wound electrode components and said thermally conductive disk, to said positive terminal;
said negative current collector conducts electrical current, from said two spirally wound electrode components and said thermally conductive disk, to said negative terminal.

12. The electrochemical battery device of claim 10, wherein at least two said thermally conductive solid disks are respectively characterized by different said thicknesses.

13. The electrochemical battery device of claim 10, wherein:
said at least one thermally conductive solid disk is at least two thermally conductive solid disks;
said at least two electrode components is at least three electrode components;
said at least two thermally conductive mandrel elements electrode components is at least three thermally conductive mandrel elements.

14. The electrochemical battery device of claim 10, further comprising a first positive terminal, a second positive terminal, a negative terminal, a first positive current collector, and a second positive current collector, wherein:
said at least one thermally conductive solid disk is electrically conductive;
said at least two spirally wound electrode components are two spirally wound electrode components;
said at least one thermally conductive solid disk is one thermally conductive solid disk;
said thermally conductive solid disk and said negative terminal are each in electrical contact with said case;
said first positive terminal and said second positive terminal are each insulated from said case;
said first positive current collector conducts electrical current, from one of said two spirally wound electrode components, to said first positive terminal;

said second positive current collector conducts electrical current, from the other of said two spirally wound electrode components, to said second positive terminal.

\* \* \* \* \*